Patented July 29, 1947

2,424,588

UNITED STATES PATENT OFFICE 2,424,588

LUBRICANT COMPOSITION

William J. Sparks, Cranford, and David W. Young, Roselle, N. J., assignors to Standard Oil Development Company, a corporation of Delaware No Drawing. Application October 2, 1943, Serial No. 504,754

9 Claims. (Cl. 252—56)

This application relates to lubricants, relates particularly to lubricating materials containing dissolved thickeners and viscosity index improvers; and relates especially to solutions, in lubricants, of the condensation products of organic acids with di-acid organic bases or glycols.

In the operation of many items of machinery, wide temperature ranges are encountered over which adequate lubrication must be accomplished, maintaining sufficient body in the lubricant at the maximum temperature to provide satisfactory lubrication, and avoiding solidification or undue thickening of the oil at a minimum temperature. This is especially true of internal combustion engines operated in winter weather when the engine must be started cold and must continue in operation with flame temperatures in the cylinders. No naturally occurring lubricating oil is satisfactory for such service over extreme temperature ranges, and many attempts have been made to improve the viscosity index in lubricants, maintaining an adequate fluidity at the lowest encountered temperature and sufficient body at the highest encountered temperature. To the present, however, no really satisfactory addition agent has been obtained.

The present invention utilizes as a lubricant a new composition of matter consisting of a light, highly refined petroleum lubricating oil containing in solution a condensation ester of a dimerized polybasic organic acid with a di-acid organic base or glycol; it being essential for the purposes of the invention that either the acid or the base have a large number of carbon atoms ranging from 15 to 30, 40 or 50 carbon atoms per molecule. The other component may have any convenient number of carbon atoms from 2 to 50; and it is immaterial whether it is the dibasic acid or the di-acid base which has the carbon atom number above 15. A preferred embodiment of the invention utilizes as the thickener an ester of ethylene glycol and polymerized linoleic acid; ethylene glycol being the polyacid base and the polymerized or dimerized linoleic acid being the polybasic acid. The condensation or esterification of the two substances is conveniently accomplished at temperatures ranging from 150° C. or 160° C. to 180° C. or 190° C. The resulting condensation product is oil-soluble, and for the purposes of the present invention, is dissolved in substantial quantity in a relatively light petroleum lubricating oil to yield lubricants having viscosity indices (as determined by the method of Dean and David published in Chemical and Metallurgical Engineering, volume 36, page 618 (1929)) ranging from 125 to 175.

The high molecular weight polybasic acids used in the preparation of the composition of matter of this invention may conveniently be prepared from corn oil or soya bean oil by a method which is essentially that described by Bradley in Industrial and Engineering Chemistry, volume 33, page 86 (1941), this reference showing the preparation of methyl dilinoleate from dehydrated, or dimerized castor oil. The important distinction resides in the present composition of matter and the procedure should be that the esterification is conducted with a glycol rather than mono alcohol. This difference results in the production of a linear chain multiple ester having a very high molecular weight ranging from 1000 to 75,000, as distinguished from Bradley's esters which add to the molecular weight of the dibasic acid only the amount of two additional methyl groups.

Thus the invention condenses a dibasic organic acid with a di-acid organic base to yield a very long chain linear ester having a relatively large number of both the acid component and the basic component in the chain, and a considerable number of oxygen atoms both in the linear chain and in side chains; the resulting high molecular weight polymer being dissolved in a lubricant to yield a product having a desired viscosity and a greatly superior viscosity index. Broadly, the components of the present invention consist of a polymer, ester, or condensation product of any dimerized organic acid with a di-acid organic base, one or both of which have from 15 to 50 carbon atoms per molecule. For the purposes of this invention it is immaterial what the character of the molecules is, and what additional substituents are present. Either or both may be saturated or unsaturated or multiply unsaturated. Either or both may be alkyl compounds or may contain aryl substituents. Either or both may contain alkyl, aryl or aromatic side chains or may contain inorganic side chains, especially halogens or the substituents from oxygen and sulfur groups or even metals, the inorganic substituents particularly being effective for the production of advantageous lubricants. These materials are esterified, with the elimination of water, to yield a high molecular weight polymer or ester or condensation product, preferably having a molecular weight above 2,000; the preferred embodiment utilizing superpoly esters having molecular weights ranging from 5,000 to 40,000. These materials are found to be strongly resistant to breakdown under heavy bearing pressures, especially when the molecular weight range is in the neighborhood of 10,000. However, a superior thickening action and viscosity index is in some instances obtained by the higher molecular weight esters.

For the dibasic acid, such substances as dimerized linoleic acid or dimerized octadecadienoic acid or dimerized linoleic or dimerized dehydrated castor oil, and the like, are especially suitable. These compounds and analogous compounds generally, including any dimerized organic acid having carbon numbers above 12 or 15 may be used for the purposes of the invention when esterified with a di-acid base such as ethylene glycol. Alternatively, however, propylene glycol, butylene glycol, and the like, are equally satisfactory. Alternatively for the glycol, such substances as pentadiol or 2-methyl-2-4 pentadiol may equally well be used. Alternatively, much higher molecular weight glycols such as those prepared by the reduction of castor oil to yield a 12 hydroxy stearol type or the dimerized and hydrogenated product of linoleic acid, or the like, may be used. As a still further alternative, the high molecular weight dimerized linoleic acid may be esterified with the high molecular weight glycol such as the 12 hydroxy stearol obtained from reduced castor oil or the like. In any event, the resulting multi ester or condensation product should have a molecular weight above 1,000, preferably above 2,000 and below 75,000 to 100,000. This material, in spite of the presence of substantial amounts of oxygen, and, in some cases other inorganic substances, is found to be soluble in hydrocarbons generally up to 10 to 25%, depending upon the character of the components of the poly ester, and upon the molecular weight. Furthermore, when so dissolved in a lubricant, the poly ester shows the unexpected and very valuable property of increasing the viscosity of the oil, and simultaneously increasing the viscosity index of the resulting lubricant to a value unobtainable by any other known composition of matter.

The above outlined improvement in viscosity index is obtainable in any petroleum lubricant, but, of course, the higher the original viscosity index of the oil, the higher the final viscosity index for a given amount and kind of polymer. For this reason, for high temperature service, the paraffinic oils are particularly desirable for the lubricant base. However, the naphthenic base oils are superior solvents for the polymer at low temperatures and, in consequence, where extremely low temperatures are encountered, the naphthenic base oils are superior, although the obtainable viscosity index may not be as high as with the paraffin base oils.

The improvement is not limited to the fluid lubricating oils but is equally marked in the heavier lubricants such as the greases. The polymer or dimerized multi-ester of the present invention is soluble in the very heavy lubricating oils to approximately the same extent, and, when so dissolved, yields a heavy grease. The material is compatible with substantially all of the grease-making compositions. When so added to greases, it is very effective as a stringiness agent and is highly effective in maintaining the body of the grease at relatively high operating temperatures, and avoiding the setting of the grease at low temperatures.

In addition, the material is compatible with paraffin wax and exerts a very profound modifying action thereon, converting the ordinarily somewhat brittle paraffin into a material which is substantially free from brittleness over a wide temperature range, yet remains a solid substantially free from cold flow at room temperature, with much greater toughness and resistance to shock. For such purposes as impregnation of paper, the composition, according to the invention, containing paraffin and the multiple ester, shows a much higher water resistance, a greatly reduced brittleness, and a much higher resistance to folding, bending, and similar treatment of the impregnated paper. For electrical insulation purposes, the electrical properties of the paraffin are substantially unchanged, but the material shows a much higher resistance to water and maintains its insulation resistance and breakdown voltage value under conditions of much heavier water content than is the case with paraffin alone.

The polyester substantially modifies the properties of the paraffin wax. The polyester is both compatible with, and soluble in, the paraffin wax, especially when the polyester is dissolved in molten paraffin wax, and upon setting, remains in solid solution. The presence of the polyester substantially increases the viscosity of the wax, both in molten form and in plastic form. This effect is particularly valuable as a means of reducing the "strike-through," which tends to occur when the wax is applied to a permeable surface and is especially valuable for the preparation of paper or other coated goods where the wax is desired as a cover on one surface only of the goods.

In addition the presence of the polyester markedly increases the low temperature flexibility of the paraffin and noticeably reduces the tendency toward chipping and brittleness at very low temperatures.

The material is advantageous in a somewhat analogous manner with the asphalts, yielding gains in the toughness and elasticity of the asphalt and reducing the change in penetration properties with change of temperature. Thus the presence of the polyester slightly softens the asphalt and greatly increases its toughness. The polyester appears to be readily soluble in the asphalt, either at elevated temperatures or at room temperatures, and it yields a very substantial protective effect upon the asphalt, showing a protective action on the asphalt against oxidation and other influences. In asphalt paints especially, it shows a very valuable improvement in the weathering characteristics, noticeably reducing not only the oxidation, but the tendency toward dusting, the tendency toward shrinkage and "alligatoring," and noticeably increases its resistance to sunlight, ultra violet light and weather influences generally.

The polyester is compatible with linseed oil and similar paint components and when so used, it has a very valuable softening and elasticating effect upon the paint, especially after prolonged drying. It is co-soluble in thinners with practically all of the paint and varnish oils, gums and resins, and, while its presence somewhat increases the viscosity of the paint, this is readily overcome by the addition of small amounts of extra thinner. The high resistance of the polyester to oxidation, ultra violet light and similar influences, enables it to exert a very valuable protective effect upon the dried paint oils, and its slight fluidity enables it to exert a continuing protective effect upon the surface of dried paint, thereby very greatly increasing the life of paint films.

The polyester is compatible with natural rubber, and with synthetic rubbers and rubber substitutes in general. It appears to co-vulcanize with both natural rubber and the various Bunas, including simple polybutadiene, the copolymer of butadiene with styrene and the copolymer of polybutadiene with acrylonitrile. In combination with these substances, it shows a very valuable softening action upon the original compound, greatly facilitating the milling and molding of the rubber compound; yet when the compound is cured, the polyester becomes an integral part of the material, thereby avoiding blooming of the softener to the surface and avoiding the addition to the compound of undesirable extractives. With the other rubber substitutes, it is a high grade softener and toughener, especially with such substitutes as the interaction product of ethylene dichloride and sodium polysulfide; with polychloroprene; with factice and the like.

In the preparation of lubricants, the polyester preferably has a molecular weight within the range from 2,000 to 40,000 or 50,000, and it is preferably added within the range of 0.5% to 25%; amounts smaller than this range having too small an effect to be valuable for most uses and amounts greater than this using an amount too great to justify the diminishing returns obtained.

Similar properties and proportions are useful for most of the other purposes for which the polyester is valuable. The details of utilization of the polyester are well shown in the following description:

EXAMPLE 1

A portion of soy bean oil consisting of 100 parts by weight was mixed with a liberal excess of methanol and heated to a temperature of 70° C. in the presence of a substantial portion of sodium methylate for a period of several hours. This procedure yielded a mixture of methyl esters of the soy bean oil, and a substantial portion of glycerol; approximately 95 parts by weight of the mixed methyl ester being obtained. The mixed methyl ester of the soy bean oil was then heated to a temperature of 300° C. for a time interval of 16 hours in the presence of an active clay type catalyst, anthraquinone or at a lower temperature for much shorter times with BF₃. This procedure produced a portion of dimerized methyl linoleate plus admixed methyl oleate and admixed methyl stearate. The dimerized linoleate methyl ester appears to have about the following formula:

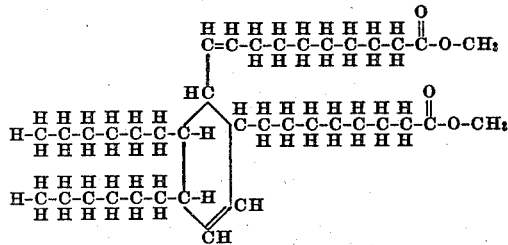

The physical properties of dilinoleic acid are:
 Unsaturation—two double bonds
 Molecular weight—560
 Neutral equivalent—280
 Conjugation—negligible
 Melting point—non-crystalline at −60° C.

The resulting mixture was distilled at a temperature of 250° C. and a pressure of 760 mm. of Hg to separate the dimerized methyl linoleate from the other substances. In this separation, methyl oleate and stearate are distilled out and removed, leaving behind the dimerized methyl linoleate. Approximately 40 parts by weight of purified dimerized methyl linoleate were obtained from 100 parts by weight of the raw soy bean oil. The purified dimerized methyl linoleate in the proportion of 40 parts by weight was then mixed with 4.5 parts of ethylene glycol and heated for 194 hours at 225° C. in the presence of about 0.05 part of p-toluene-sulfonic acid. The p-toluene-sulfonic acid is the catalyst for the glycolysis reaction. In order to assure rapid removal of by-products from the reaction, the melt was blown with pure nitrogen. This procedure resulted in the following reaction:

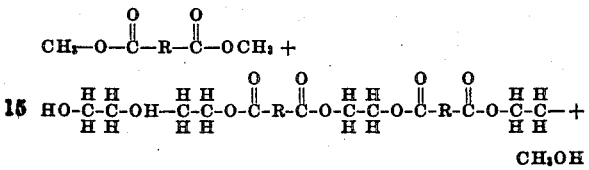

The resulting methanol was removed from the material by heating and distillation to yield the desired condensation product of dimerized methyl linoleate and ethylene glycol.

The condensation product had a molecular weight (as determined by the Paul J. Flory method (Journal of the American Chemical Society, volume 62, 1057 (1940)) of approximately 10,000 and an iodine number of 98. The material had a light yellow color closely corresponding to that of a good grade of Mid-Continent phenol-extracted lubricating oil. The condensation product was free from odor and taste and by itself had a viscosity of approximately Z6+ at 100° C. (Gardner-Holdt). The super-polyesters were also very soluble in chloroform and were non-crystalline plastic solids which exhibited elastic properties. Portions of this polymer were dissolved in a good grade of phenol-extracted lubricating oil sold as "Barosa 43." The addition of the polyester did not alter the color of this oil. The "Barosa 43" oil had a viscosity index, alone, of 110 and a Saybolt Standard Universal viscosity at 210° F. of 43 seconds. Amounts equal to 1%, 3% and 6% of oil samples taken were dissolved in successive samples of the warm oil and the viscosities and viscosity indices were determined as recorded in Table I below:

*Table I*

| Percent Polymer | Kinematic Viscosity in Centistokes at— | | S. S. U. at 210° F. | V. I. |
|---|---|---|---|---|
| | 100° F. | 210° F. | | |
| 1 | 35.43 | 5.98 | 45.76 | 123.5 |
| 3 | 39.53 | 7.29 | 50.01 | 143.0 |
| 6 | 46.80 | 9.50 | 57.50 | 154.5 |

A property of viscosity index improvers generally is what is known as a viscosity index ceiling. That is, with a given oil, the addition of a small amount, usually a fraction of 1%, gives an improvement in the viscosity index; a larger amount, say 1%, gives a greater improvement in the viscosity index. A still larger amount, say 2% or 3%, may yield only a small or negligible increase in viscosity index, and a still larger amount up to 10, 20 or 30%, may yield no increase in viscosity index, but merely a thickening effect which is substantially the same at both 100° F. and 210° F. This maximum improvement of the viscosity index obtainable by some rather small amount of the addition agent and not increased by any larger amount of the thickening agent, is a unique characteristic of each particular viscosity index improver. The specific viscosity index ceiling depends to some extent upon the character of the base oil, being somewhat higher with a base oil which has a high viscosity index than with a base oil having a low viscosity index. Simple polyisobutylene has a viscosity index ceiling in the best available base oil of approximately 130. The acrylate resins in the best available base oil have a viscosity index ceiling at about 145. In conspicuous contrast, the present addition agent shows a viscosity index ceiling in the best, or even in a reasonably good base oil, of 175 or above. Thus the viscosity index improver of the present invention shows a viscosity index ceiling far higher than that for any other known viscosity index improver and the material is unique and outstandingly important in this characteristic.

The present invention is equally useful in all types of lubricating oil. In Example 1 a high V. I. base oil with a V. I. of 110 was used.

Example 2

The multi ester prepared as in Example 1 from ethylene glycol and dimerized linoleic acid was dissolved in a low viscosity index mineral oil; a naphthenic base oil. This oil had a S. S. U. viscosity at 210° F. of 38.45 seconds and a viscosity index of 9.0. In this oil there was dissolved 1%, 3% and 6%. The ethylene glycol dilinoleic multi ester and the viscosities and viscosity indices of the resulting compositions of matter were determined as shown in Table 2.

Table 2

| Percent Polymer | Kinematic Viscosity in Centistokes at— | | S. S. U. at 210° F. | V. I. |
|---|---|---|---|---|
| | 100° F. | 210° F. | | |
| Oil alone | | | 38.45 | 9 |
| 1 | 31.31 | 4.74 | 41.76 | 62 |
| 3 | 39.73 | 6.16 | 46.33 | 111 |
| 6 | 90.38 | 12.83 | 69.49 | 132 |

It will be noted that even with 6% of the polymer in this oil, the viscosity index was improving rapidly, and even in this low-grade base oil, the viscosity index ceiling is very high; higher than obtainable in such an oil with any other addition agent.

Portions of these compounds were treated with a sulfurized alkylated phenol containing barium incorporated thereinto by a treatment with barium hydroxide. The material has the following structural formula:

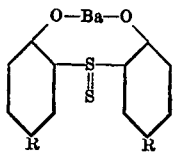

(in which R may be any convenient or desired aliphatic or aromatic substituent). This material was freely soluble in the oil containing the multi-ester and no cloud formation was noted in the solution at 212° F., 100° F., or —5° F.; indicating that the barium hydroxide treated sulfurized alkylated phenol is compatible with the multi-ester in oil solution. This characteristic of ready solubility and compatibility in that the resulting composition is conspicuously free from tendency towards corrosion, conspicuously free from sludging tendencies since the barium hydroxide treated sulfurized alkylated phenol is a very efficient sludge disperser, is free from acid-forming tendencies, since the barium hydroxide treated sulfurized alkylated phenol neutralizes acid as formed, and yields very much improved bearing performance, forming a thin film of sulfur, particularly on copper lead type of bearings which greatly reduces weight loss in the bearing. In this respect, the polyester is markedly superior to substantially all of the other addition agents, most of which are not compatible with barium hydroxide treated sulfurized alkylated phenol and therefore, did not permit of the production of an oil having the durability and low corrosion property in combination with the high V. I. properties which are obtainable by the composition of matter in the present invention.

Example 3

A mixture was prepared consisting of 3127 parts by weight of dilinoleic acid (having an index of refraction at 40° C. of 1.4816) with 972 parts by weight of decamethylene glycol. This material was heated to temperatures within the range between 195° C. and 230° C. for about 120 hours to cause the esterification. At the end of this time the material was cooled to room temperature and the molecular weight was found to be 12,000. 12% by weight of this polymer was then dissolved in a clear base oil sold commercially as Winkler gas oil. This material had a flash point of 215° F. and a kinematic viscosity at 100° F. of 2.9 centistokes and the aniline point was 178. Viscosity results and viscosity index values of the blend are shown in Table 3.

(It should be noted that the Winkler gas oil had a viscosity at 210° F. so low as to be below the scale at which the measurement of viscosity index starts and accordingly the Winkler gas oil has no measurable viscosity index; hence these values cannot be given in the table for the clear oil, but only the viscosity in centistokes at 100° F.)

Table 3

| Percent Polymer | Kinematic Viscosity in Centistokes at— | | S. S. U. at 210° F. | V. I. |
|---|---|---|---|---|
| | 100° F. | 210° F. | | |
| Clear oil | 2.9 | | | |
| 12.0 | 59.29 | 17.65 | 88.4 | 163.2 |

This table shows the effective conversion into a high-grade lubricating oil of a relatively crude oil which ordinarily would not be regarded as having lubricating properties of any substantial value.

Example 4

The polyester prepared as above described in Example 1 was incorporated into a typical heavy grease having the following composition:

| | Parts |
|---|---|
| Mineral oil (40 S. S. U. V.) 210° F. V. I. 80 | 84 |
| Calcium hog fat soap | 15 |
| Polyester | 1 |

This composition showed an excellent stringiness and an excellent viscosity index; excellent low temperature response and good pressure resistance.

Almost any of the ordinary grease improvers may be utilized in connection with the super polyester, and it is found to be compatible with practically all of them for the making of very valuable, high grade lubricants.

EXAMPLE 5

A mixture was prepared consisting of 97 parts of paraffin wax having a melting point of approximately 122° F. with 3 parts of super polyester prepared as in Example 1 having a molecular weight of approximately 15000. Upon testing this composition it was found to show a very susbtantial increase in toughness and elasticity, a sharp reduction in brittleness and chipping at low temperatures, below 0° F. and a greatly improved operativeness for coating a paper, with substantially no tendency toward blocking.

The resulting hydrocarbon composition containing the polyester according to the present invention shows a much higher compatibility with a wide range of substances than is found with most other thickened materials. Most of the efficient pour-point depressants are useful in a lubricant prepared as above disclosed, to increase, still further, the useful temperature range. Likewise most of the efficient oxidation inhibitors are compatible with the composition of the present invention to improve the durability of the resulting lubricant.

Similarly most of the oiliness agents, especially of the type of tri-ortho-cresyl phosphate; sludge dispersing agents; mutual solvents such as high molecular weight liquid alcohols, dyes and the like are compatible in the hydrocarbon composition of the present invention for still greater improvement of the resulting lubricants.

The multi ester, as above disclosed, has a substantial amount of unsaturation and a comparatively high iodine number. If desired, the iodine number can be reduced by a hydrogenation treatment of the di-linoleic acid, prior to the glycolysis reaction. This procedure results in a multi ester having a relatively very low iodine number and a higher stability and resistance to oxidation.

Alternatively, the unsaturated multi ester, may be treated with chlorine or other halogen, with sulfur chloride, with oxygen, and the like to modify the multi ester, reduce its unsaturation and incorporate into the lubricant, inorganic elements which markedly improve the extreme pressure characteristics. This is especially valuable with the greases and heavy oils suitable for lubricants in which a substantial percentage of chlorine, sulfur, oxygen or phosphorous can be incorporated for the benefit to be obtained by the presence of such substances.

The dimerized dibasic acid may be esterified with aliphatic glycols, as above pointed out, or with aromatic diols having a wide range of organic and inorganic substituents at other points in the benzene ring (such substances as those represented by the following formulae are particularly effective).

(A) 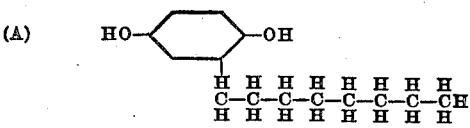

(B) 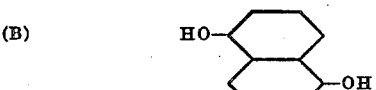

(C) 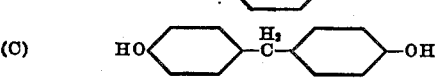

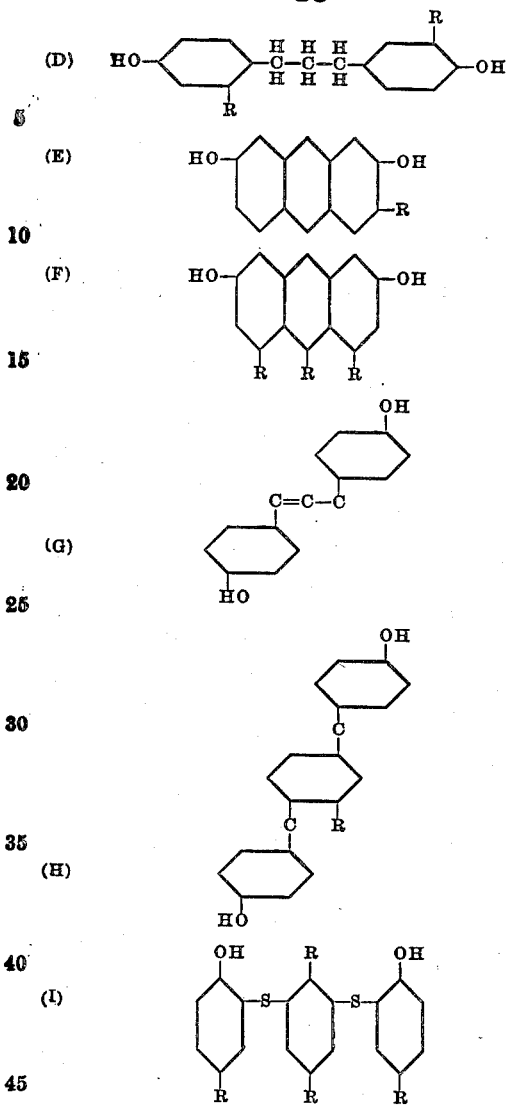

These components of the composition of the invention have many advantages, yielding many valuable and helpful modifications of the resulting lubricant.

It is not necessary that either component be a strictly linear chain compound but either component, either the di-basic acid or di-acid base, may have aromatic substituents in the linear chain between the terminal groups, or in side chains on the chain between the terminal groups; and side chains of substantially any size, number and disposition are useful and effective and yield many varied improvements in the characteristics of the resulting lubricant.

Thus the invention provides a new viscosity index improving agent previously unknown and unusual, which shows the unexpected and very valuable property of a higher viscosity index limit than has been obtainable from any prior material.

While there are above disclosed but a limited number of embodiments of the composition of the present invention, it is possible to produce still other embodiments without departing from the inventive concept herein disclosed and it is therefore desired that only such limitations be imposed on the appended claims as are stated therein or required by the prior art.

The invention claimed is:

1. A lubricant comprising a liquid petroleum hydrocarbon fraction containing dissolved therein about 0.5% to 30% of a linear polyester condensation product of a dimer of an unsaturated vegetable oil fatty acid with a glycol of the general formula HO—R—OH, in which R is an aliphatic hydrocarbon group, said condensation products having an average molecular weight of at least 2000.

2. A lubricant comprising a hydrocarbon oil of the gas oil to lubricating oil viscosity range containing dissolved therein a viscosity index improving amount of at least 0.5% of a linear condensation product of a dimerized unsaturated long chain aliphatic acid with ethylene glycol, said condensation product having an average linear weight of at least 5000.

3. A lubricant comprising a hydrocarbon lubricating oil substance in at least 70% proportion containing therein a viscosity index improving amount of about 1% to 30% of a linear polyester condensation product of a glycol and a dimerized monobasic unsaturated long-chain aliphatic acid, the said dimer being characterized by a cyclic portion and a plurality of said chains attached to the cyclic portion, the said condensation product having an average molecular weight of at least 2000.

4. A lubricant comprising in combination at least about 94% of a phenol extracted lubricating oil characterized by a viscosity index of 110 and an SSU viscosity at 210° F. of 43 seconds, having dissolved therein from 1 to 6% of a linear polyester of a glycol and a dimerized monobasic unsaturated long-chain aliphatic acid, the said dimer being characterized by a cyclic portion and a plurality of side chains attached to the cyclic portion, the said solution having as a lubricant a SSU viscosity at 210° F. of from 45 to 57 seconds and a viscosity index from 123 to 145, said polyester having an average molecular weight of about 2000 to 50,000.

5. A lubricant comprising a hydrocarbon lubricating oil having an SSU viscosity at 210° F. of approximately 38 seconds and a viscosity index of approximately 9, having dissolved therein from 1 to 6% of ethylene glycol dilinoleic multiester having an average molecular weight of about 10,000; the solution having an SSU viscosity at 210° F. between 41 and 70 seconds and a viscosity index between 62 and 132.

6. A lubricant comprising a major proportion of a mineral lubricating oil base stock containing dissolved therein a viscosity index improving amount of about 0.5% to 25% of a linear polyester condensation product of an aliphatic hydrocarbon glycol with a dimerization product of a material selected from the group consisting of linoleic acid and lower alkyl esters thereof, said polyester having a molecular weight of at least 5000.

7. Lubricant according to claim 6 also containing dissolved therein a sludge dispersing and corrosion preventing amount of a barium hydroxide treated sulfurized alkylated phenol.

8. A lubricant comprising a major proportion of a petroleum hydrocarbon oil of a gas oil viscosity range, containing dissolved therein a viscosity index improving amount of about 1% to 30% of a linear polyester condensation product of a dimerized unsaturated long-chain aliphatic acid and a glycol, said condensation product having an average molecular weight of at least 5000.

9. Lubricant according to claim 8 in which the polyester is a condensation product of dilinoleic acid and decamethylene glycol.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,039,111 | Pevere | Apr. 28, 1936 |
| 2,123,641 | Wiezevich | July 12, 1938 |
| 2,134,736 | Renter | Nov. 1, 1938 |
| 2,152,683 | Eichwald | Apr. 4, 1939 |

FOREIGN PATENTS

| Number | Country | Date |
|---|---|---|
| 428,864 | Great Britain | May 15, 1935 |

OTHER REFERENCES

Drying Oils and Resins, by Bradley et al., vol. 33, No. 1, Ind. & Eng. Chem.

Linear Superpolyesters from Dilinoleic Acid, by Cowan et al., Jour. Am. Chem. Soc., Jan. 1944.

Synthetic Oils From Residual Dimerized Fat Acids, by Cowan and Falkenburg, pp. 153–157, pub. in Oil & Soap, Aug. 1943. (Copy in Div. 63.)